Jan. 4, 1966     F. J. ZUMAQUERO     3,227,581
PROCESS FOR RENDERING CERAMICS SLIGHTLY CONDUCTIVE
Filed Feb. 23, 1960     2 Sheets-Sheet 2

INVENTOR.
FRANK J. ZUMAQUERO
BY Leon F. Herbert
Robert W. Dilts
ATTORNEYS

United States Patent Office 3,227,581
Patented Jan. 4, 1966

3,227,581
PROCESS FOR RENDERING CERAMICS SLIGHTLY CONDUCTIVE
Frank J. Zumaquero, Sunnyvale, Calif., assignor to Eitel-McCullough, Inc., San Carlos, Calif., a corporation of California
Filed Feb. 23, 1960, Ser. No. 10,279
2 Claims. (Cl. 117—227)

This invention relates to electron tubes and to a method of, and means for, making them. In particular, this invention relates to electron tubes having insulating portions which are provided with a "semi-conductive" surface layer, and to a method of and means for producing such layers.

In recent years the use of ceramic material instead of glass in vacuum tubes has increased because ceramic is more rugged, has lower dielectric losses, has higher resistance to softening, and has less tendency to release gases at high temperatures. Because ceramic is a much better material to use in vacuum tubes, the output power of tubes has been increased by taking advantage of the better properties of the ceramic. Recently, in ceramic tubes which should be capable of producing more power, the ceramics have been observed to fail when the power output approached the theoretical rating of the tube. The most common failure observed is a "leaky" ceramic, either cracked or with a hole therethrough. An arc-type discharge is usually observed before such failures.

It is an object of the present invention to produce an improved ceramic electron tube.

It is another object of the present invention to make a ceramic tube capable of producing large amounts of power without risk of rupturing the ceramic.

It is a further object of the present invention to provide a "semi-conductive" surface layer on the dielectric wall portion of high-power vacuum electron tubes.

It is yet another object of the present invention to provide a method for making a ceramic, and especially alumina, with a "semi-conductive" surface layer.

It is still another object of the present invention to provide a ceramic member, and especially an alumina member, for an electron tube, which member has a "semi-conductive" surface layer.

The invention provides an insulator, especially an alumina insulator, for an electron tube in which the insulator is made to have a stable "semi-conductive" surface layer and relates to a novel process for applying the "semi-conductive" surface layer.

The invention possesses other objects and features of advantage some of which, with the foregoing, will be set forth in the following description of the preferred embodiment of the invention. It is to be understood, of course, that the invention is not limited to the disclosed embodiment but includes other variant embodiments thereof within the scope of the appended claims.

Figure 1:
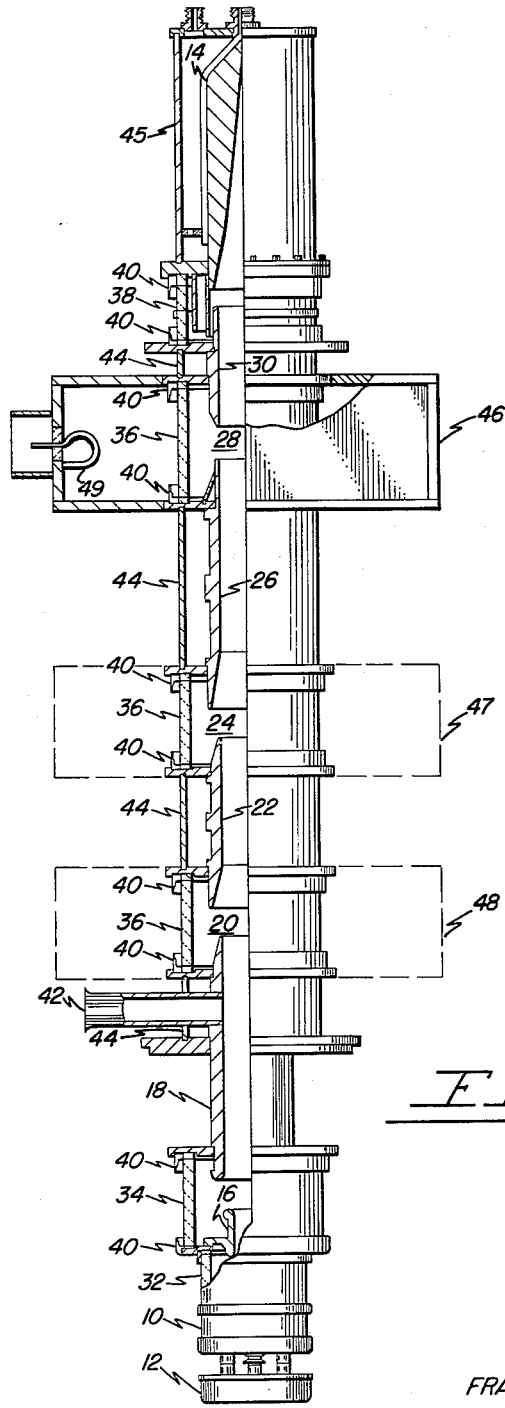

Referring to the drawings:
FIGURE 1 is a partial sectional view of a klystron tube having tubular alumina insulators serving as portions of the vacuum envelope.

Figure 2:
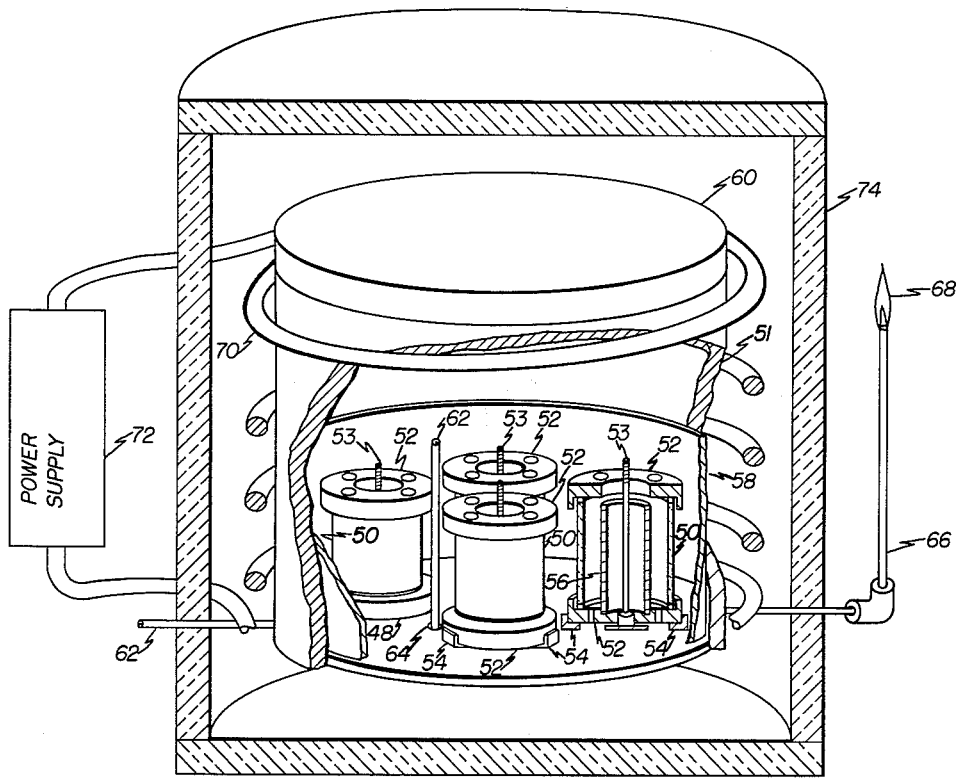

FIGURE 2 is a perspective view of an apparatus for applying the "semi-conductive" surface layer on the alumina members, broken away to show the interior thereof.

It is believed that the process as claimed and described herein can be used for forming a "semi-conductive" surface layer on most insulators, and that an insulator having a "semi-conductive" surface layer as claimed and described herein is applicable to all electron tubes. A case of special interest is a klystron having externally tunable cavities, since this type of glystron is preferably used to amplify high-frequency energies to very large powers. Consequently an insulator which can withstand high temperatures must be used as the vacuum wall dividing the internal evacuated portion of the cavities from the external portion of the cavities. An insulating material suitable for this application is a ceramic made of alumina.

Referring to the drawings in greater detail and to FIGURE 1 in particular, there is shown an electron gun 10 with a suitable socket 12, attached at one end of a klystron tube capable of producing 1.25 megawatts of power. The electron gun generates an electron beam which is collected by a collector 14 at the other end of the tube. Between the electron gun 10 and the collector 14 is a modulating anode 16 which modulates the electron beam, a drift tube 18, a control interaction gap 20 which velocity modulates the electrons in the beam, another drift tube section 22, an intermediate interaction gap 24, another drift tube section 26, a working interaction gap 28, and a drift tube section 30. A ceramic insulator 32 is disposed between the electron gun 10 and the modulating anode 16 and another ceramic insulator 34 is disposed between the modulating anode and the drift tube section 18. Around each of the interaction gaps 20, 24, and 28 is disposed a ceramic insulator 36, and a ceramic insulator 38 is disposed between the drift tube section 30 and the collector 14. The last ceramic insulator 38 enables the collector to be maintained at a voltage lower than that of the drift tube sections 18, 22, 26, and 30. Each of the ceramic insulators 32, 34, 36, and 38 has a suitable vacuum seal 40 which seals the ceramic insulators to the adjacent metallic parts of the klystron. The interior of the klystron is evacuated through a suitable tubulation 42 which is located near the control gap 20 and which communicates with the interior of drift tube 18. Tubular water cooling jackets 44 are provided around each of the drift tube sections 22, 26, and 30, and a cooling jacket 45 is provided around the collector 14.

The illustrated klystron operates in a conventional manner. In order to complete the klystron circuit, external cavities 46, 47, and 48 are placed around each interaction gap and around each ceramic insulator 36, and a suitable beam-retaining magnetic field is oriented parallel to the beam path. The output cavity 46 with a coupling loop 49 is shown in detail, and the input cavity 48 and the intermediate cavity 47 are indicated by dash lines and are shown in outline form. As stated above, the electon gun 10 generates a beam of electrons which travel along the tube axis to the collector 14. When the electrons pass the control gap 20, they are velocity modulated to form bunches by the weak electromagnetic field in the input cavity 48. The bunches of electrons, as they pass the working gap 28, give up their energy to the output cavity 46, producing electromagnetic oscillations of very large magnitudes in the cavity.

Klystron tubes of this type, designed to deliver large amounts of power were found to fail much below the expected power output during development tests; in fact, only half the expected power was achieved. Experiments revealed that when one tried to place a larger load on the klystron, the ceramic in the output cavity ruptured as evidenced by cracks and pinholes in the ceramic. An arc-type discharge was usually observed or heard before a tube failed. One of the causes of this phenomenon is believed to be that an electrostatic charge builds up on the ceramic to a large value and suddenly discharges thereby rupturing the ceramic. The need for an insulator with enough electrical conductivity so that a charge did not build up on it, and one in which the heat ($I^2R$) losses in the insulator were low, thus keeping the insulator from overheating, was indicated. Since after diligent search no suitable materials were found for this use, various processes and mehods were tried in order to make an alumina member slightly conductive. Such methods included sintering a very thin metallic layer on the ceramic; painting and then reducing an oxide conductive coating on the ceramic, and others. These processes either produced a relatively low resistance, a non-uniform resistance, or a non-stable coating, and sometimes two or all three of the faults were present.

In the past the surface of lead silicate glass has been rendered slightly conductive by heating the glass in an atmosphere of hydrogen to a temperature below 500° C. The surface of the treated glass had a measured resistance of about 1000 megohms per square. (The resistance of thin surface layers having uniform thickness is commonly given in terms of "ohms per square." The resistance of any square area of a film is the same as that of any other square area no matter what the size, provided the thickness is uniform.) But when lead glass is heated in a hydrogen atmosphere to over 520° C., the glass blackens quickly and it has no conductivity. Therefore, this process for forming a conductive film on glass could not be used in a high-power and high-temperature tube in which the insulators are subjected to temperatures over 500° C. during fabrication and operation.

Since glass can be made to have a conductive surface layer, and since the alumina ceramic members such as are generally used in vacuum tubes are 94% alumina and contain impurities such as various amounts of silicon oxide, lead oxide and other compounds such as may be found in glass, the alumina ceramic members were treated similarly to the glass by heating the ceramic in an hydrogen-reducing atmosphere but at a temperature higher than 520° C., which is the minimum temperature at which a ceramic is expected to operate in a tube. The ceramic assumed a black color, just as in the case of glass described above, and had no conductivity.

The subject invention provides a process which will repeatedly produce an even, stable, semi-conductive surface layer on the ceramic. According to the subject invention an alumina ceramic member, containing about 94% alumina, and a piece of copper are placed within a sealed retort containing an atmosphere of dry hydrogen, and then heated to almost the melting temperature of copper for a specific length of time. The ceramic was found to become coated with a semi-conductive surface layer which was both evenly distributed and stable.

Experimentation has shown that ceramic treated in accordance with this invention has a surface resistivity between 8,000 and 800,000 megohms per square and have been proven to have the proper conductivity when installed in a klystron of the type described. Thus the term "semi-conductive" as used herein and in the claims refers to a surface on an insulating member the conductivity of which is not altered by hydrochloric acid, as will be disclosed hereinafter, which is stable at a temperature above 520° C. and the resistance of which measures between 1,000 and 800,000 megohms per square.

For clarity of description, the composition of the semi-conductive surface layer will be further explained in conjunction with the apparatus shown in FIGURE 2 and the novel process for producing the semi-conductive surface layer on a tubular alumina ceramic member.

Referring to FIGURE 2, there is shown an apparatus for applying the semi-conductive surface layer to ceramics. In this embodiment tubular alumina insulator members 50 are shown, but other shapes may be substituted for the tubular sections without departing from the invention. The tubular alumina members 50, which may be any of the ceramic pieces 32, 34, 36, or 38 in FIGURE 1, are placed in a retort 51 made of mild steel. If desired, the tubular members 50 may be first metalized at their ends by a suitable metalizing process before they are placed in the retort, but the members 50 need not be first metalized. The retort 51 is made of mild steel because it is relatively inexpensive and has the required physical properties, including strength and a relatively high melting temperature. The alumina members 50 are mounted on carbon discs 52 which are in turn mounted on stainless steel shims 54 on the base of the retort 51. A length of copper tubing 56 is placed inside each of the alumina members 50, and a carbon disc 52 is placed over the members 50. A rod 53 facilitates the handling of the above assembly. In this retort there are shown four alumina members assembled as described but more or fewer can be placed in the retort. A tubular copper liner 58 is disposed next to the sidewalls of the retort. A cover 60 is welded to the retort 51. A pipeline 62 supplies hydrogen gas into the interior of the retort 51, and the hydrogen is exhausted therefrom through an aperture 64 in the retort base and is conducted by a pipe 66 to a flame curtain 68.

The process is started by first purging the retort 51 with nitrogen to remove most or all of the oxygen therein, and then dry hydrogen is continuously supplied into the retort. The flame curtain 68 prevents heavy atmospheric gases from entering the retort. The retort 51 is then heated to a temperature between 1040° and 1060° C. (which is approximately the melting point of copper), and in this embodiment the retort is shown heated by an electric heating coil 70 connected to a suitable power supply 72. An oven 74 surrounds the retort 51 and heating coil 70. The hydrogen entering the retort is dry hydrogen, and in this embodiment the hydrogen used has a dew point of −80° C. or less. The process was tried with wetter hydrogen but the semi-conductive surface layer was not always produced and when it was, the resistance values were inconclusive in that they were not as reproducible as when drier hydrogen was used. Since the temperature of the retort 51 is approximately the melting temperature of copper at atmospheric pressure, the copper from the tubing 56 and liner 58 is caused to sublime and condense on any exposed surface, such as the surfaces of the ceramic members 50. After the temperature of the retort has been held at the designated temperature mentioned above for an interval of time (in this embodiment 15 to 20 minutes proved sufficient), the retort is allowed to cool, the hydrogen supply is shut off, the retort is opened, and the alumina members 50 are removed.

The resistance of alumina members 50 with metalized ends was measured by the application of 30 kilovolts across the ceramic from one metalized end to the other. The resistance of tubular members having a length between 8 and 9 inches and a diameter of 10 inches was found to be over 1,000 megohms but below 100,000 megohms. This resistance on the ceramic can be controlled i.e., made greater or less, by increasing or decreasing the exposure time of the ceramic to the copper at the elevated temperatures.

The alumina, after being subjected to the above-described process, had very definite physical characteristics, which were determined by various tests conducted to determine the physical state of the semi-conductive surface layer on the alumina. In one such test the coated ceramic was washed in hydrochloric acid (HCl) and then its resistance was rechecked. There was no appriciable change in the resistance reading. The HCl acid bath was tested for copper which may have been dissolved therein and there was no detectable trace of copper in the HCl bath. The surface of the coated ceramic was tested under a microscope and was found to contain small dark spots. The same ceramic was then given a bath in hydrofluric (HF) acid. The alumina, after this bath, had infinite resistance. The HF bath was tested for copper and was found to contain dissolved copper. A microscopic examination of the surface of the ceramic now showed a complete absence of dark spots. From these tests, the dark spots on the alumina were concluded to be small deposits of copper embedded immediately below the surface of, and protected by, the ceramic, since the HCl bath did not affect the resistance. This novel process caused the copper to sublime from the liner 58 and tubing 56, and then the copper is believed to have become embeded, combined, or dissolved by a chemical process within the constituents of the ceramic and, more particularly, within the silica component of the ceramic.

One theory which may explain this phenomenon of the formation of the semi-conductive surface layer is that the copper vapor deposits on the ceramic. The copper dissolves into the silicon oxide in the ceramic through some chemical action perhaps forming copper oxide. After the copper oxied is dissolved within the silicon oxide, hydrogen atoms are believed to penetrate the surface and reduce the copper oxide to the metal form which is finely dispersed near the surface. It is believed that other ceramics can be made to have a semi-conductive surface layer by using this process, and that other metals can be used instead of copper to form the layer. Some of the characteristics that should be present in the metal are assumed to be that the metal should have a melting temperature lower than that of ceramic, the metal should sublime from the solid to the vapor state, the metal should form an oxide which dissolves or combines with one of the components of the ceramic, and the oxide of the metal after being dissolved in the ceramic should be capable of being reduced by the hydrogen to form finely dispersed metal particles along or near the surface. The above-described process, used with 94% alumina ceramic, was attempted on a ceramic which contained almost 100% alumina and the semi-conductive surface layer was not formed thereon. Since HF acid reacts with the surface layer, one can reason that there should be some silicon oxide present in the ceramic in order to form the semi-conductive surface layer. An alloy of 90% copper and 10% nickel was substituted for pure copper in the retort in another experiment. Since the 90–10 alloy melts at a higher temperature than does copper, the temperature of the retort was correspondingly increased. The semi-conductive surface layer which was formed by the 90–10 alloy was found to be more stable at elevated temperatures than the semi-conductive surface layer which was formed by the pure copper. This alloy is used in ceramics for tubes which operate at higher ambient temperatures than tubes using pure copper in the ceramics. Gold and silver, since they have chemical characteristics similar to those of copper, may be used to form the semi-conductive surface layer on ceramics, but copper is preferred because it is economical and the temperatures for practicing the process are relatively low.

I claim:
1. The process of rendering a normally non-conductive ceramic material semi-conductive comprising the steps of heating a ceramic comprising about 94% alumina in a hydrogen atmosphere which has a dew point of $-80°$ C. or less and in the presence of copper metal to a temperature ranging from $1040°$ C. to $1060°$ C., said atmosphere being at substantially atmospheric pressure, and maintaining said temperature for at least approximately 15 minutes whereby a chemical reaction occurs between said ceramic and copper impregnating said ceramic with conductive particles and rendering said ceramic with a semi-conductive surface layer.

2. The process of rendering a normally non-conductive ceramic material slightly conductive even after the treated ceramic is subjected to temperatures over $520°$ C., said proceess comprising placing the ceramic material and copper in a chamber together, providing a dry hydrogen atmosphere in the chamber, said atmosphere being at substantially atmospheric pressure, and raising the temperature in said chamber high enough to cause copper vapor to impregnate the ceramic in an amount giving a resistance of between 1,000 and 800,000 megohms per square.

References Cited by the Examiner

UNITED STATES PATENTS

| | | | |
|---|---|---|---|
| 2,266,595 | 12/1941 | Fraenckel | 313—313 X |
| 2,422,609 | 6/1947 | Auwarter | 117—229 X |
| 2,597,562 | 5/1952 | Blodgett | 313—58 X |
| 2,619,611 | 11/1952 | Norton et al. | 315—5.35 |
| 2,629,066 | 2/1953 | Eitel et al. | 315—5.35 |
| 2,640,167 | 5/1953 | Atlee et al. | 313—58 |
| 2,833,953 | 5/1958 | Rodgers | 313—313 X |
| 2,852,415 | 9/1958 | Colbert et al. | 117—229 X |
| 2,867,746 | 1/1959 | Preist | 315—5.35 |
| 2,877,143 | 3/1959 | Gallup | 117—107 X |
| 2,877,145 | 3/1959 | Baer | 117—227 |
| 2,885,310 | 5/1959 | Olson et al. | 117—227 |
| 3,051,592 | 8/1962 | Woerner | 117—227 X |
| 3,069,286 | 12/1962 | Hall | 117—107 X |

JOSEPH B. SPENCER, *Primary Examiner.*

RALPH G. NILSON, ARTHUR GAUSS, ROBERT SEGAL, RICHARD D. NEVIUS, *Examiners.*